United States Patent
Gao et al.

(10) Patent No.: US 9,973,296 B2
(45) Date of Patent: *May 15, 2018

(54) MULTIPLE-WAVELENGTH PASSIVE OPTICAL NETWORK (PON) POWER SAVING

(71) Applicant: Futurewei Technologies, Inc., Plano, TX (US)

(72) Inventors: Jianhe Gao, Wuhan (CN); Yuanqiu Luo, Cranbury, NJ (US); Dekun Liu, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/720,719

(22) Filed: Sep. 29, 2017

(65) Prior Publication Data

US 2018/0026739 A1 Jan. 25, 2018

Related U.S. Application Data

(63) Continuation of application No. 14/873,381, filed on Oct. 2, 2015, now Pat. No. 9,780,906.

(60) Provisional application No. 62/061,029, filed on Oct. 7, 2014.

(51) Int. Cl.
*H04J 14/00* (2006.01)
*H04J 14/02* (2006.01)

(52) U.S. Cl.
CPC ...... *H04J 14/0246* (2013.01); *H04J 14/0257* (2013.01)

(58) Field of Classification Search
CPC .......................... H04J 14/0246; H04J 14/0257
USPC ........................................................ 398/69
See application file for complete search history.

(56) References Cited

U.S. PATENT DOCUMENTS

| | | | |
|---|---|---|---|
| 9,136,968 B2 | 9/2015 | Lee et al. | |
| 9,225,424 B2 | 12/2015 | Odaka et al. | |
| 9,590,726 B2 | 3/2017 | Skubic et al. | |
| 2011/0236017 A1 | 9/2011 | Ohlen | |
| 2013/0094862 A1 | 4/2013 | Luo et al. | |
| 2015/0055955 A1 | 2/2015 | Kim et al. | |
| 2016/0080105 A1 | 3/2016 | Khotimsky et al. | |

OTHER PUBLICATIONS

"Common Public Radio Interface (CPRI); Interface Specification," Interface Specification, CPRI Specification V6.1, Jul. 1, 2014, 129 pages.

(Continued)

*Primary Examiner* — Juan A Torres
(74) *Attorney, Agent, or Firm* — Conley Rose, P.C.

(57) ABSTRACT

An optical line terminal (OLT) comprising a processor configured to process a first power consumption data associated with a first optical network unit (ONU) for a plurality of wavelength channels in a multiple-wavelength passive optical network (PON), and select a first target wavelength channel from the plurality of wavelength channels based on the first power consumption data in order to reduce power consumption at the first ONU, and a transmitter coupled to the processor and configured to transmit to the first ONU a tuning control message instructing the first ONU to tune to the first target wavelength channel.

20 Claims, 8 Drawing Sheets

(56) References Cited

OTHER PUBLICATIONS

"Series G: Transmission Systems and Media, Digital Systems and Networks, Digital Sections and Digital Line System—Optical Line Systems for Local and Access Networks, 10-Gigabit-Capable Passive Optical Networks (XG-PON): Transmission Convergence (TC) layer specification," ITU-T, G.987.3, Jan. 2014, 146 pages.
"Draft new Recommendation ITU-T G.989.3 (for Consent, Apr. 4, 2014)," TD 200 Rev.1 (PLEN/15), Mar. 24-Apr. 4, 2014, 164 pages.
"Series G: Transmission Systems and Media, Digital Systems and Networks, GPON Power Conservation," ITU-T, Series G, Supplement 45, May 2009, 46 pages.
Carstens, "Passive Optical Network (PON) Structure with Dynamic Wavelength Allocation (DWA)," Disclosure No. IPCOM000169373D, Apr. 24, 2008, 7 pages.
Nokia, "Hybrid Uplink Architecture for Passive Optical Networks," Disclosure No. IPCOM000181623D, Apr. 7, 2009, 8 pages.
Office Action dated Mar. 23, 2017, 12 pages, U.S. Appl. No. 14/873,381, filed Oct. 2, 2015.
Notice of Allowance dated Jun. 5, 2017, 7 pages, U.S. Appl. No. 14/873,381, filed Oct. 2, 2015.

600 →

| | | | | | | |
|---|---|---|---|---|---|---|
| 610 | ONU ID | X | | | | |
| 620 | ONU SN | Y | | | | |
| 630 | ONU environment Temperature [°C] (optional) | Z°C | | | | |
| 640 | Tx Channel | CH1 | CH2 | CH3 | CH4 | ... |
| 650 | Tx Power dissipation | A | B | C | D | ... |
| 660 | Currently operating Tx channel | CH_3 | | | | |
| 670 | Rx Channel | CH1 | CH2 | CH3 | CH4 | ... |
| 680 | Rx Power dissipation | E | F | G | H | ... |
| 690 | Currently operating Rx channel | CH_2 | | | | |

FIG. 6

MULTIPLE-WAVELENGTH PASSIVE OPTICAL NETWORK (PON) POWER SAVING

CROSS-REFERENCE TO RELATED APPLICATIONS

This application is a continuation application of U.S. patent application Ser. No. 14/873,381 filed on Oct. 2, 2015 by Futurewei Technologies, Inc. and titled "Multiple-Wavelength Passive Optical Network (PON) Power Saving," which claims priority to U.S. provisional patent application No. 62/061,029 filed on Oct. 7, 2014 by Futurewei Technologies, Inc. and titled "Multiple-Wavelength Passive Optical Network (PON) Power Saving," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over the last mile, which is the final portion of a telecommunications network that delivers communication to customers. A PON is a point-to-multipoint (P2MP) network that comprises an optical line terminal (OLT) at a central office (CO), an optical distribution network (ODN), and optical network units (ONUs) at customer premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a promising solution for future broadband access services. WDM PONs may provide high-speed links with dedicated bandwidth up to about 10 gigabits per second (Gb/s). By employing a wavelength-division multiple access (WDMA) scheme, each ONU in a WDM PON is served by a dedicated wavelength channel to communicate with the CO or the OLT.

Next-generation PONs (NG-PONs) and NG-PONs stage 2 (NG-PON2s) may include point-to-point WDM PONs (P2P-WDM PONs) and time- and wavelength-division multiplexing (TWDM) PONs, which may provide data rates higher than 10 Gb/s. TWDM PONs combine TDMA and WDMA to support higher capacity so that an increased number of users may be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an optical line terminal (OLT) comprising a processor configured to process a first power consumption data associated with a first optical network unit (ONU) for a plurality of wavelength channels in a multiple-wavelength passive optical network (PON), and select a first target wavelength channel from the plurality of wavelength channels based on the first power consumption data in order to reduce power consumption at the first ONU, and a transmitter coupled to the processor and configured to transmit to the first ONU a tuning control message instructing the first ONU to tune to the first target wavelength channel.

In another embodiment, the disclosure includes an ONU comprising a processor configured to generate a power consumption report message to indicate a first power consumption of the ONU when the ONU operates at a first wavelength channel of a plurality of wavelength channels in a multiple-wavelength PON, and a second power consumption of the ONU when the ONU operates at a second wavelength channel of the plurality of wavelength channels, wherein the second power consumption is lower than the first power consumption, a transmitter coupled to the processor and configured to send the power consumption report message to an OLT, and a receiver coupled to the processor and configured to receive from the OLT a tuning control message instructing the ONU to tune to the second wavelength channel.

In yet another embodiment, the disclosure includes a method implemented by an OLT, comprising collecting an ONU power consumption information for a set of wavelength channels in a PON system, wherein the set of wavelength channels comprises a current operating wavelength channel of the ONU, selecting a target wavelength channel with a lower power consumption than the current operating wavelength channel from the set of wavelength channels according to the collected power consumption information, and instructing the ONU to tune to the target wavelength channel with the lower power consumption.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a schematic diagram of an optical network unit (ONU) power consumption record according to an embodiment of the disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NG-PONs and NG-PON2s, including multiple-wavelength PONs such as WDM PONs, P2P-WDM PONs, and TWDM PONs, employ multiple transmission wavelengths to increase network capacity. For example, NG-PON2s may provide a network capacity of about 40 Gb/s. In a multiple-wavelength PON, an OLT manages multiple upstream wavelength channels and multiple downstream wavelength channels and assigns ONUs with upstream and downstream wavelength channels. Upstream refers to the direction of communication from an ONU to an OLT, whereas downstream refers to the direction of communication from the OLT to the ONU. As such, ONUs that operate in multiple-wavelength PONs are wavelength-tunable ONUs, which are built with optical modules that are wavelength tunable in both the upstream and the downstream directions. For example, a tunable optical module may comprise a configurable optical tunable filter in a receive path for selecting a receive wavelength and a tunable wavelength controller in a transmit path for tuning to a transmit wavelength. The tunable optical modules may be designed by employing various technologies, such as thermal tuning, voltage or current tuning, and mechanical tuning.

Figure 1:
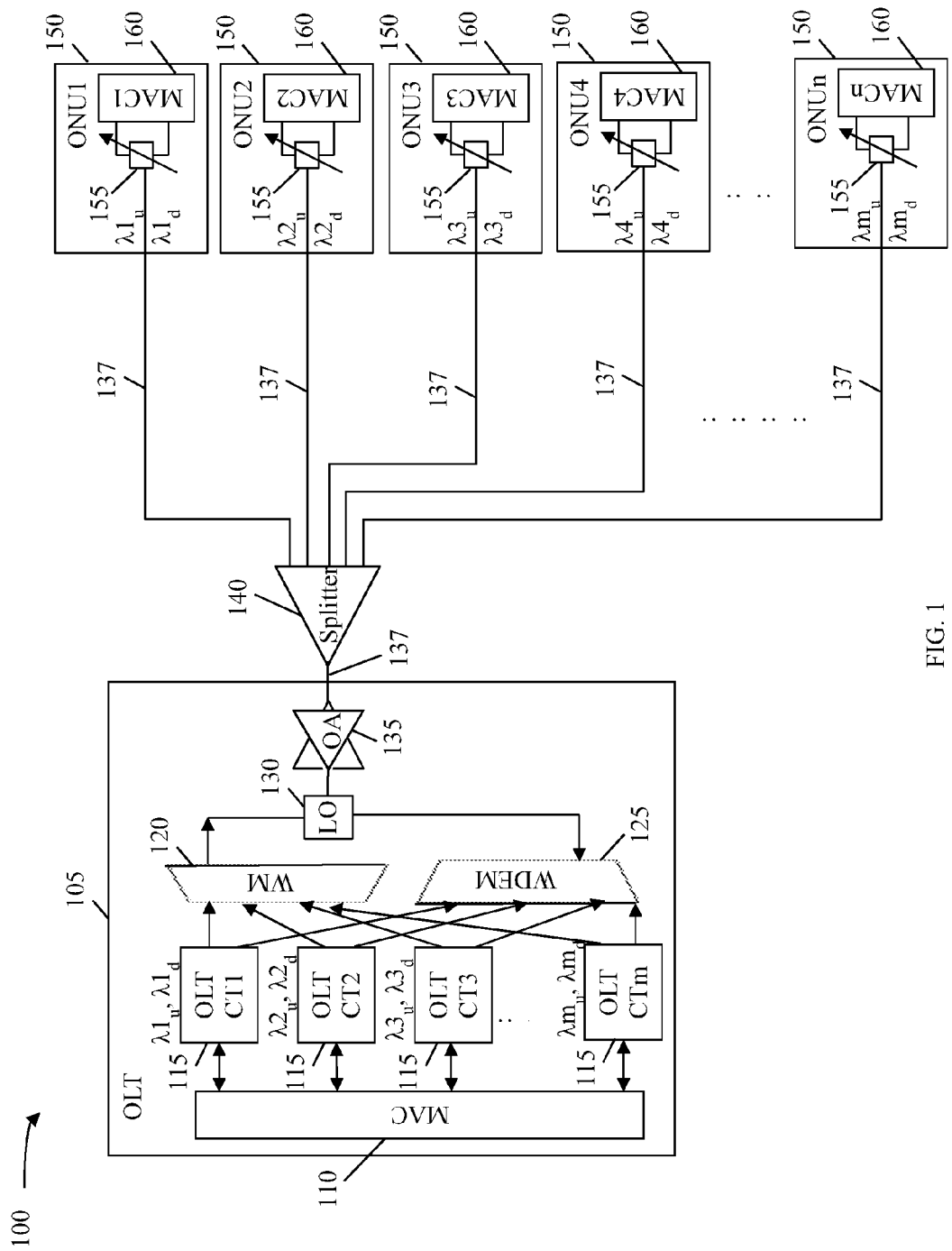
FIG. 1 is a schematic diagram of a time- and wavelength-division multiplexing (TWDM) passive optical network (PON).

FIG. 1 is a schematic diagram of a TWDM PON 100. The TWDM PON 100 is suitable for implementing the disclosed embodiments. The TWDM PON 100 is a communications network that does not require any active components to distribute data between an OLT 105 and a plurality of ONUs 150, depicted as ONU1 to ONUn, where n is a positive integer. Instead, the TWDM PON 100 uses passive optical components to distribute data between the OLT 105 and the ONUs 150. The TWDM PON 100 may adhere to any standard related to multiple-wavelength PONs. The TWDM PON 100 comprises the OLT 105, a splitter 140, and the ONUs 150.

The OLT 105 is any device configured to communicate with the ONUs 150 and a backbone network. For example, the backbone network may connect the TWDM PON 100 to the Internet. Specifically, the OLT 105 may act as an intermediary between the backbone network and the ONUs 150. For instance, the OLT 105 forwards data received from the backbone network to the ONUs 150 and forwards data received from the ONUs 150 to the backbone network. When the backbone network uses a network protocol that differs from the PON protocol used in the TWDM PON 100, the OLT 105 comprises a converter (not shown) that converts the backbone network protocol to the PON protocol. The OLT 105 converter may also convert the PON protocol into the backbone network protocol.

The OLT 105 comprises a media access control (MAC) module 110, a plurality of OLT channel terminations (CTs) 115, depicted as OLT CT1 to OLT CTm, a wavelength multiplexer (WM) 120, a wavelength demultiplexer (WDEM) 125, a local oscillator (LO) 130, and a bi-directional optical amplifier (OA) 135, where m is a positive integer. The MAC module 110 is any module suitable for performing protocol stack functions and interfacing with a physical layer. For example, the MAC module 110 may provide addressing and channel access control services to the physical layer, as described more fully below to determine upstream and downstream transmission schedules, and to perform packet address filtering operations. A downstream schedule comprises downstream transmission opportunities for the OLT 105 to transmit downstream signals to the ONUs 150. An upstream schedule comprises upstream transmission opportunities for the ONUs 150 to transmit upstream signals to the OLT 105. A TWDM PON 100 transmission opportunity includes a wavelength channel and a time slot, as described more fully below. In a transmit direction or a downstream direction, the MAC module 110 instructs the OLT CTs 115 to transmit downstream signals to the ONUs 150 according to the downstream transmission schedules and to provide the upstream transmission schedules to the ONUs 150. In a receive direction or an upstream direction, the MAC module 110 instructs the OLT CTs 115 to receive and processes upstream signals transmitted by the ONUs 150 and perform packet processing functions. The OLT CTs 115 comprise transmitters (not shown) and receivers (not shown). The transmitters may comprise tunable lasers or other devices suitable for converting electrical signals into optical signals and transmitting the optical signals on separate downstream wavelength channels to the WM 120. The receivers may comprise photodiodes or other devices suitable for receiving optical signals from a plurality of upstream wavelength channels and converting the received optical signals into electrical signals. As shown, the downstream wavelength channels employ a first set of m wavelengths at $\lambda 1_d$ to $\lambda m_d$ and the upstream wavelength channels employ a second set of m wavelengths at $\lambda 1_u$ to $\lambda m_u$. Each OLT CT 115 employs a pair of upstream and downstream wavelength channels to communicate with one or more ONUs 150. The WM 120 is any suitable wavelength multiplexer, such as an arrayed waveguide grating (AWG). The WM 120 multiplexes the downstream wavelength channel signals generated by the OLT CTs 115 into a combined downstream signal and forwards the combined downstream signal to the LO 130. The LO 130 adds characteristics to the downstream combined signal in order for the ONUs 150 to properly extract the signals. The LO 130 then forwards the combined downstream signal to the OA 135, which amplifies the combined downstream signal as needed in order to forward the combined downstream signal to a splitter 140 via an optical fiber 137. The OA 135 may also receive a combined upstream signal from the splitter 140 via the optical fiber 137 and amplify the combined upstream signal as needed in order to forward the combined upstream signal to the WDEM 125. The WDEM 125 is similar to the WM 120 and de-multiplexes the combined upstream signal into multiple optical signals with different wavelength channels, then forwards the multiple optical signals to the OLT CTs 115.

The splitter 140 is any device suitable for splitting an optical signal into a plurality of optical signals in one transmission direction and combining a plurality of optical signals into a single signal in an opposite transmission direction. For example, in the downstream direction, the splitter 140 splits the combined downstream signal into n number of downstream optical signals, one for each ONU 150. Conversely, in the upstream direction, the splitter 140 receives a plurality of upstream signals from the ONUs 150, combines the received upstream signals into a combined upstream signal, and forwards the combined upstream signal to the OA 135.

The ONUs 150 are any devices suitable for communicating with the OLT 105. The ONUs 150 comprises wavelength tunable components 155 and MAC modules 160. The wavelength tunable components 155 comprise wavelength tunable transmitters (not shown) and wavelength tunable filters (not shown). The MAC modules 160 are similar to the MAC module 110.

The OLT 105 provides WDM capability by assigning each ONU 150 a downstream wavelength channel and an upstream wavelength channel for communicating with the OLT 105. The OLT 105 may also provide TWDM capability by dividing a wavelength channel into multiple time slots such that multiple ONUs 150 may communicate with the OLT 105 on a same wavelength channel. To implement a TWDMA scheme, the OLT 105 associates a downstream wavelength channel and an upstream wavelength channel with each OLT CT 115 and assigns one or more ONUs 150 to operate on a pair of upstream and downstream wavelength channels in different time slots. The OLT 105 may employ various mechanisms and metrics to assign wavelength channels to the ONUs 150, as described more fully below. It should be noted that the TWDM PON 100 may be configured as shown or alternatively configured as determined by a person of ordinary skill in the art to achieve similar functionalities.

Figure 2:
FIG. 2 is a table of distributed feedback (DFB) laser transmitter operating current measurement for various wavelengths and room temperatures.

FIG. 2 is a table 200 of DFB laser transmitter operating current measurements for various wavelengths and room temperatures. The current measurements are obtained from a commercially available optical module comprising a DFB laser transmitter. For example, an ONU, such as the ONUs 150, may employ the optical module for optical signal transmission. The current measurements shown in the table 200 are obtained by varying the transmission wavelength of the DFB laser transmitter at a fixed room temperature and measuring the operating current of the DFW laser transmitter at different transmission wavelengths. The current measurements for the same transmission wavelength are then repeated at another room temperature. The measurements are taken when the DFB laser transmitter is operating at a relatively stable voltage level. As shown, the columns 210, 220, and 230 show current measurements at room temperatures of 70 degrees Celsius (° C.), 25° C., and 0° C., respectively. At each room temperature, the transmission wavelength is set to a number of wavelength channels, depicted as CH1, CH2, CH3, and CH4. As shown, the DFB laser transmitter operating current varies with operating temperature, as well as with wavelength channels. For example, at 25° C., the operating current for the channel CH4 with a wavelength of about 1,538.19 nanometers (nm) is about 40 milliamps (mA) greater than the channel CH1 with a wavelength of about 1,535.82 nm. At 70° C., the operating current for the channel CH4 with a wavelength of about 1,538.18 nm is about 80 mA less than the channel CH1 with a wavelength of about 1,535.82 nm. As such, the DFB laser transmitter consumes different amounts of power at different temperatures and different wavelengths. It should be noted that tunable DBR laser transmitters, thermally tunable receivers, and other optical transmitters and receivers may comprise similar power consumption properties, where different wavelength channels consume different amounts of power.

Power saving has become increasingly important for designing access networks, such as the TWDM PON 100. Power saving for ONUs, such as the ONUs 150, is especially important since a major portion of power in access networks is consumed by ONUs. A common power saving technique is to power off an ONU's transceiver or a portion of the ONU's transceiver when the ONU is not scheduled to transmit or receive. For example, International Telecommunication Union Telecommunication Standardization Sector (ITU-T) Series G, Supplement 45 (G.Sup45), May 2009, which is incorporated by reference, describes several power saving operational modes such as power shedding, dozing, and sleep modes for TDM PONs to reduce ONU power consumption by powering off various portions or stages of ONU transmitters and receivers. For example, when an ONU operates in a power shedding mode, the ONU may power down or reduce power for certain non-essential functions and services. When the ONU operates in a dozing mode, the ONU may additionally power off the ONU's transmitter for some periods of time while the ONU's receiver may continue to operate. When the ONU operates in a sleep mode, the ONU may power off the ONU's transmitter and receiver for a substantial period of time. ITU-T G.987.3, January 2014, which is incorporated by reference, describes ONU power management signaling and state machines in 10 gigabit PONs (XG-PONs) to reduce ONU power consumption. The ITU-T G.987.3 employs similar power saving mechanisms as described in the G.Sup45 with some additional power saving modes.

As described above, to support wavelength tuning capabilities, ONUs may employ tunable optical modules that are capable of tuning to several wavelength channels. A tunable optical module may comprise additional components and circuitries such as tunable optical filters and wavelength tuning control circuitries for tuning to a specific wavelength channel and stabilizing the wavelength channel. The additional tuning components and circuitries may consume additional power. As such, a tunable optical module may consume more power than an optical module that operates at a fixed wavelength. As such, ONU power consumption may be a great concern for PONs such as the NG-PON2s that employ multiple wavelength channels for transmissions.

Disclosed herein are various embodiments for saving power in multiple-wavelength PONs by selecting wavelength channels based on ONU power consumption. For example, a PON is configured to operate in a plurality of upstream wavelength channels and a plurality of downstream wavelength channels. To assign wavelength channels for power saving, an OLT requests each connected or registered ONU to report ONU power consumption for the upstream and downstream wavelength channels. A connected or registered ONU is an ONU that has completed a PON activation procedure, which may include discovery, ranging, and authentication, and is served by the OLT. In response, each ONU reports ONU upstream power consumption and ONU downstream power consumption. ONU upstream power consumption refers to the amount of power consumed by the ONU while transmitting a signal on an associated upstream wavelength channel. ONU downstream power consumption refers to the amount of power consumed by the ONU while receiving a signal from an associated downstream wavelength channel. Subsequently, the OLT selects a pair of upstream and downstream wavelength channels for each ONU according to the ONU upstream and downstream power consumptions such that power consumption is reduced among the ONUs. In an embodiment, the OLT and the ONUs exchange physical layer operations, administration and maintenance (PLOAM) messages as described in ITU-T G.989.3 draft, Jul. 3, 2015, which is incorporated by reference, to establish communication channels between the OLT and the ONUs. The disclosed embodiments extend the PLOAM messages to include power consumption inquiry and report to facilitate wavelength channel assignment by power consumption as described in ITU-T G.989.3. The disclosed embodiments may be applied in conjunction with any channel allocation schemes, which may include various factors such as ONU polling times, channel noise, and traffic loading. Although the present disclosure describes power saving mechanisms in the context of a TWDM PON, the disclosed power saving mechanisms are suitable for any multiple-wavelength PONs, such as WDM PON and P2P-WDM PONs.

Figure 3:
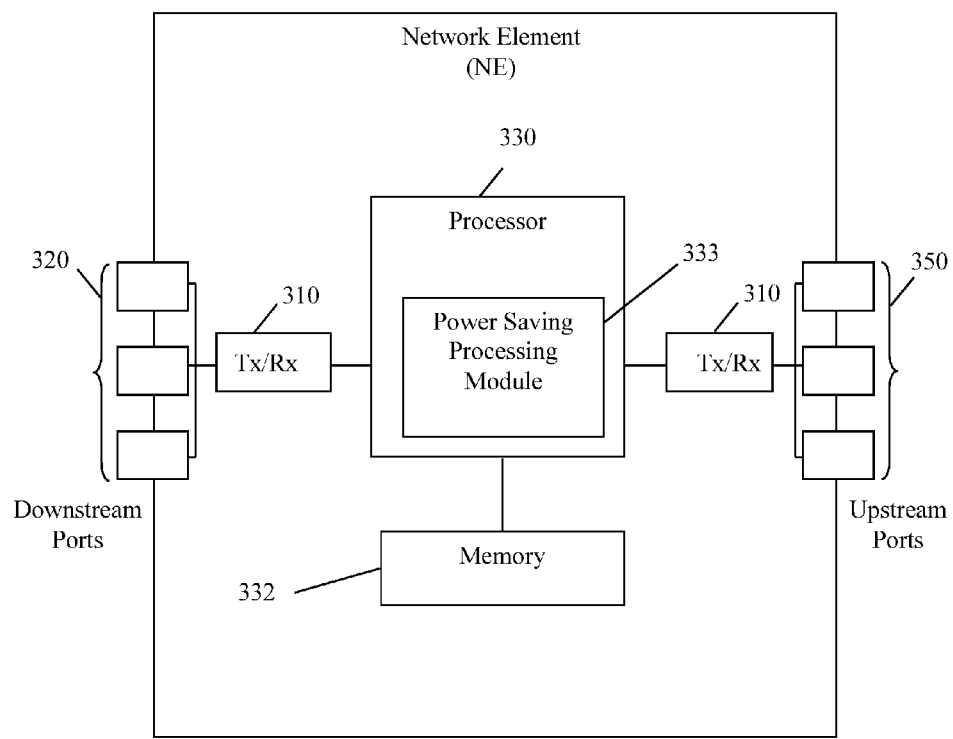
FIG. 3 is a schematic diagram of a network element (NE).

FIG. 3 is a schematic diagram of an NE 300, which may act as an OLT such as the OLT 105, or an ONU such as the ONU 150, or any node in a network such as the PON 100, by implementing any of the schemes and mechanisms described herein. NE 300 may be implemented in a single node, or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware.

As shown in FIG. 3, the NE 300 comprises transceivers (Tx/Rx) 310, which may be transmitters, receivers, or combinations thereof. A Tx/Rx 310 is coupled to plurality of downstream ports 320 for transmitting and/or receiving frames from other nodes and a Tx/Rx 310 is coupled to plurality of upstream ports 350 for transmitting and/or receiving frames from other nodes, respectively.

A processor 330 is coupled to each Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs).

The processor 330 comprises a power saving processing module 333, which performs processing functions of an OLT or an ONU and implements the protocol diagram 400 and the method 500, as discussed more fully below, and/or any other flowcharts, methods, and tables discussed herein. As such, the inclusion of the power saving processing module 333 and associated methods and systems provide improvements to the functionality of the NE 300. Further, the power saving processing module 333 effects a transformation of a particular article (e.g., the NE 300) to a different state. In an alternative embodiment, the power saving processing module 333 may be implemented as instructions stored in the memory devices 332, which may be executed by the processor 330. The memory device 332 may comprise a cache for temporarily storing content, e.g., a random-access memory (RAM). Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. When the NE 300 is acting as an OLT, the memory device 332 may be configured to store ONU power consumption information received from ONUs, as described more fully below. When the NE 300 is acting as an ONU, the memory device 332 may be configured to store ONU power consumption at different wavelengths and different operating temperatures obtained from calibration measurements or manufacture data specifications, as described more fully below.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example, in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
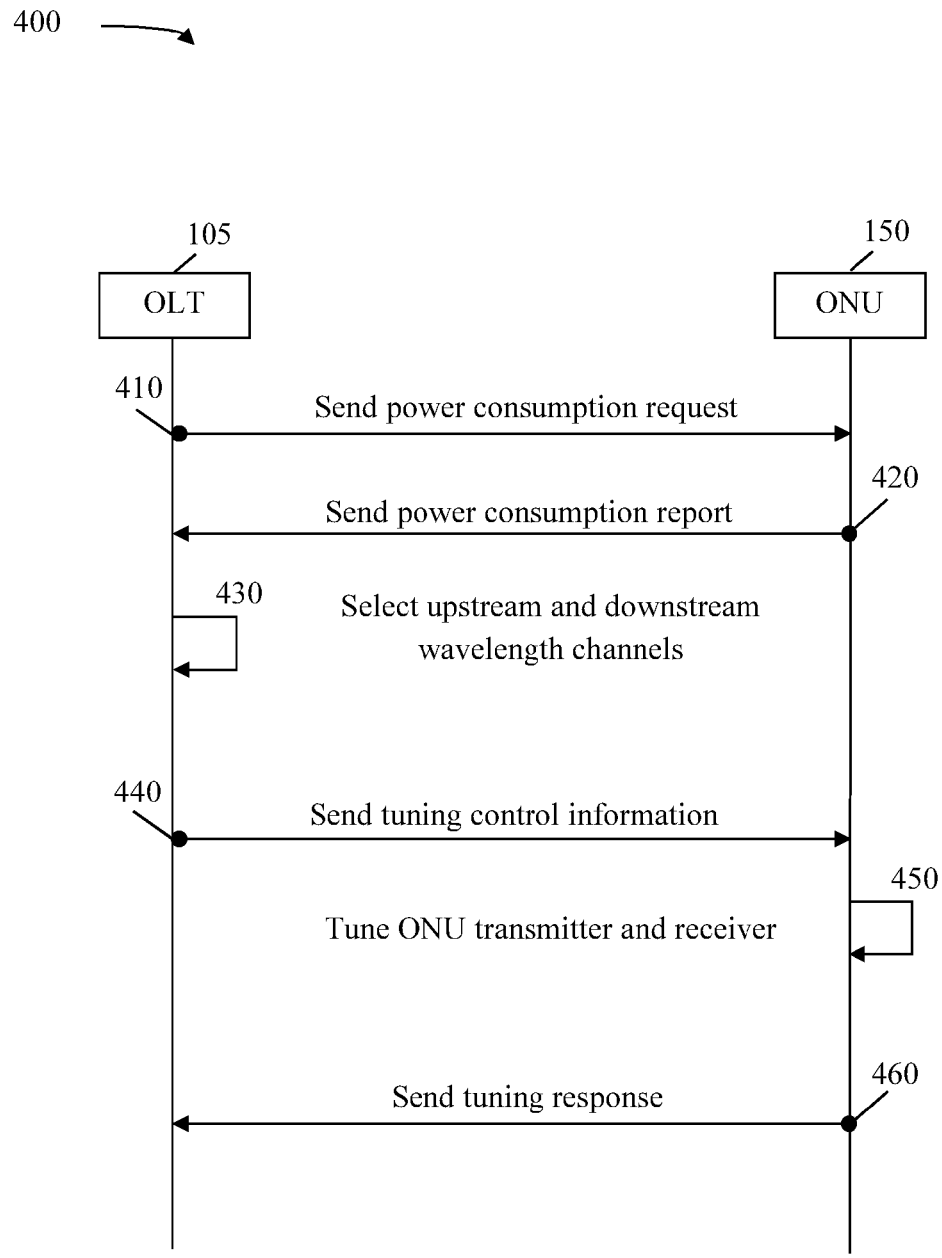
FIG. 4 is a protocol diagram for wavelength channel selection according to an embodiment of the disclosure.

FIG. 4 is a protocol diagram 400 for wavelength channel selection according to an embodiment of the disclosure. The protocol diagram 400 is implemented between an OLT such as the OLT 105, and an ONU such as the ONU 150, in a multiple-wavelength PON such as the TWDM PON 100 or a WDM PON. For example, the PON is configured to operate in a set of wavelength channels, which may comprise a plurality of upstream wavelength channels and a plurality of downstream wavelength channels. The protocol diagram 400 is implemented after an ONU has registered with the OLT. For example, the ONU is tuned to one of the upstream wavelength channels and one of the downstream wavelength channels for registration. The protocol diagram 400 may be implemented any time after completing the ONU registration and activation process. The protocol diagram 400 may be repeated during the connection lifetime of the ONU.

At step 410, the OLT sends the ONU a request for power consumption information of the ONU associated with the set of wavelength channels. For example, the request may be sent via a Power_Consumption_Inquire PLOAM message, as described more fully below.

At step 420, upon receiving the request, the ONU sends a power consumption report to the OLT. For example, the power consumption report may be sent via a Power_Consumption_Report PLOAM message, as described more fully below. The power consumption report may indicate ONU upstream power consumption for each upstream wavelength channel and ONU downstream power consumption for each downstream wavelength channel. ONU upstream power consumption is associated with the amount of power consumed by the ONU's transmitter when operating on a corresponding upstream wavelength channel, whereas ONU downstream power consumption is associated with the amount of power consumed by the ONU's receiver when operating on a corresponding downstream wavelength channel. In an embodiment, the ONU may calibrate and measure the ONU's transmitter and receiver power consumption at different wavelengths and different temperatures and store the measurements in memory, such as the memory device 332, before the ONU is installed in the PON. In another embodiment, the power consumption information may be provided by manufacturers and stored in the ONU's memory. In yet another embodiment, the ONU measures and stores its power consumption when prompted by the OLT at any other suitable time. Upon receiving a power consumption request, the ONU may measure or obtain a current operating temperature and generate a power consumption report by retrieving the power consumption for the different upstream and downstream wavelength channels at the current operating temperature from the ONU's memory.

At step 430, the OLT selects an upstream wavelength channel and a downstream wavelength channel for the ONU according to the received power consumption report to minimize power consumption at the ONU. The OLT may employ various mechanisms for wavelength channel selection. For example, when a wavelength channel with the minimum ONU power consumption is available for allocation, the OLT may assign the wavelength channel to the ONU. Alternatively, the OLT may assign wavelength channels to the ONU and other ONUs in the PON such that all ONUs may operate at the lowest possible power. The OLT may apply other channel assignment constraints such as bandwidth, channel signal-to-noise ratios (SNR), channel noise profile, channel throughput, ONU polling time, quality of service (QoS), and traffic loading in conjunction with the ONU power consumption. For example, the OLT may generate a weighted metric function based on the constraints and select a wavelength channel by optimizing the weighted metric function. The OLT may adjust the weightings for the constraint based on deployment configurations and requirements. In an embodiment, the OLT may further employ a predetermined power saving threshold to avoid frequent wavelength channel tunings. For example, the OLT may select a new wavelength channel for the ONU when the ONU power consumption for the new wavelength channel is less than the predetermined power saving threshold.

A step 440, after selecting an upstream wavelength channel and a downstream channel for the ONU, the OLT sends tuning control information to the ONU to request the ONU to tune to the selected upstream wavelength channel and the selected downstream wavelength channel. For example, the tuning control information may be sent via a Tuning_Control PLOAM message. In an embodiment, a PON may be configured to employ a set of predetermined wavelength channels and may identify the predetermined wavelength channels by wavelength channel identifiers (IDs). In such an embodiment, the tuning control information may indicate IDs of the selected upstream and downstream wavelength channels. In addition, the tuning control information may indicate other tuning parameters such as a time when the ONU has to be tuned to the selected upstream and downstream wavelength channels and operate in the selected upstream and downstream wavelength channel.

At step 450, upon receiving the tuning control information, the ONU tunes the ONU's transmitter and the receiver to the upstream wavelength channel and the downstream wavelength channel received in the tuning control information, respectively.

At step 460, after completing the tuning, the ONU sends a tuning response to the OLT indicating completion of the tuning. For example, the tuning response may be sent via a Tuning_Response PLOAM message.

Figure 5:
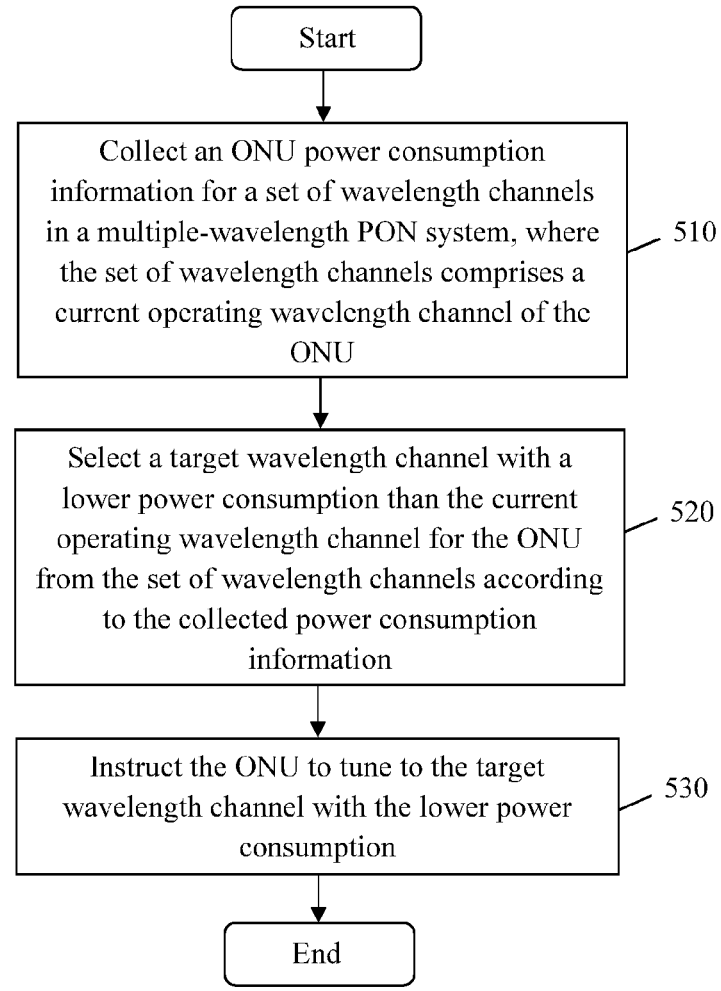
FIG. 5 is a flowchart of a power saving method based on wavelength channel selection according to an embodiment of the disclosure.

FIG. 5 is a flowchart of a power saving method 500 based on wavelength channel selection according to an embodiment of the disclosure. The method 500 is implemented by an NE, such as the NE 300 and the OLT 105, in a PON system, such as the TWDM PON 100 or a WDM PON. The method 500 employs similar mechanisms as described in the protocol diagram 400. The method 500 is implemented when the OLT is serving a registered ONU, such as the ONU 105. At step 510, power consumption information for a set of wavelength channels is collected from the ONU. The set of wavelength channels comprises a current operating wavelength channel of the ONU and at least one other available wavelength channel in the PON. The set of wavelength channels may be TWDM channels or P2P-WDM channels. For example, the current operating wavelength channel and the available wavelength channel are upstream wavelength channels and the power consumption information may indicate the ONU's transmitter power consumption for the current operating wavelength channel and the available wavelength channel. Alternatively, the current operating wavelength channel and the available wavelength channel are downstream wavelength channels, and the power consumption information may indicate the ONU's receiver power consumption for the current operating wavelength channel and the available wavelength channel. The OLT may collect the ONU power consumption by exchanging PLOAM messages with the ONU. For example, the OLT may send a power consumption inquiry PLOAM message to the ONU and receive a power consumption report PLOAM message from the ONU. The power consumption inquiry and report PLOAM message are described more fully below.

At step 520, a target wavelength channel with a lower power consumption than the current operating channel is selected for the ONU from the set of wavelength channels according to the collected power consumption information. In order to avoid frequent tuning, the OLT may employ a predetermined power saving threshold. For example, for each wavelength channel, the OLT may determine whether the ONU power consumption for an associated wavelength channel is less than a predetermined power saving threshold. If the ONU power consumption is less than the predetermined power saving threshold, then the OLT selects the associated wavelength channel as the target wavelength channel. At step 530, the ONU is instructed to tune to the selected target wavelength with the lower power consumption. It should be noted that the OLT may employ various channel selection constraints and metrics, such as SNRs, bandwidth, and traffic loads, in conjunction with the power consumption criteria to select the target wavelength channel.

FIG. 6 is a schematic diagram of an ONU power consumption record 600 according to an embodiment of the disclosure. The record 600 may be employed by an OLT, such as the OLT 105, to track power consumption of connected or registered ONUs, such as the ONUs 150, in a PON, such as the TWDM PON 100. For example, the OLT may request a power consumption report from an ONU and may subsequently receive a power consumption report from the ONU by employing the protocol diagram 400 and the method 500. After receiving the power consumption report, the OLT may generate a record such as the record 600 to store the ONU power consumption in a local memory device, such as the memory device 332. As shown, the record 600 comprises an ONU ID field 610, an ONU serial number (SN) field 620, an ONU environment temperature field 630, a transmit (Tx) channel field 640, a Tx power dissipation field 650, a currently operating Tx channel field 660, a receive (Rx) channel field 670, a Rx power dissipation field 680, and a currently operating Rx channel field 690.

The ONU ID field 610 indicates an ID that identifies a particular ONU in the PON. The ONU SN field 620 indicates a universally unique ID assigned to the ONU, for example, during manufacturing. The ONU environment temperature field 630 indicates an operating environment temperature of the ONU. The Tx channel field 640 indicates upstream wavelength channel IDs. The Tx power dissipation field 650 indicates the amount of power consumed by the ONU for transmitting signals on each of the upstream wavelength channels identified in the Tx channel field 640. The currently operating Tx channel field 660 identifies an upstream wavelength channel that is currently employed by the ONU for transmission. The Rx channel 670 indicates downstream wavelength channel IDs. The Rx power dissipation field 680 indicates the amount of power consumed by the ONU for receiving signals from each of the downstream wavelength channels identified in the Rx channel field 670. The currently operating Rx channel field 690 identifies a downstream wavelength channel that is currently employed by the ONU for reception. It should be noted that the ONU environment temperature field 630 may be optional. In addition, the record 600 may be alternatively configured as determined by a person of ordinary skill in the art to achieve similar functionalities.

Figure 7:
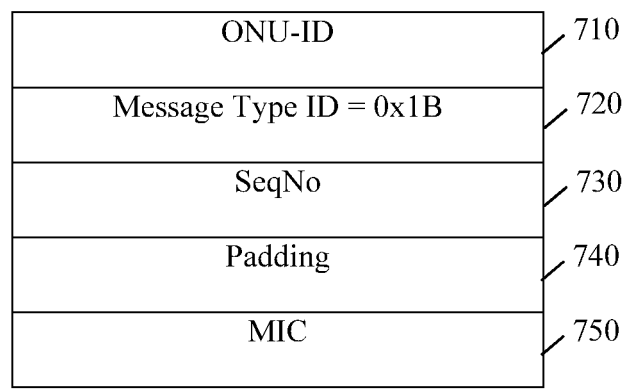
FIG. 7 is a schematic diagram of a power consumption inquiry message according to an embodiment of the disclosure.

FIG. 7 is a schematic diagram of a power consumption inquiry message 700 according to an embodiment of the disclosure. The message 700 is employed by an OLT, such as the OLT 105, to request an ONU, such as the ONU 150, to send ONU power consumption information as described in the protocol diagram 400 and the method 500. The message 700 is referred to as a downstream Power_Consumption_Inquire PLOAM message. For example, the OLT may send the message 700 as a standalone message in a PLOAM channel. The message 700 comprises an ONU-ID field 710, a message type ID field 720, a sequence number (SeqNo) field 730, a padding field 740, and a message integrity check (MIC) field 750.

The ONU-ID field 710 is about two octets long. The ONU-ID field 710 may be set to a particular ONU ID that identifies a particular tuned-in ONU indicating the message 700 is a message directed to the particular tuned-in ONUs. A connected ONU is an ONU that is registered with the OLT and communicating with the OLT in an upstream wavelength channel and a downstream wavelength channel. Alternatively, the ONU-ID field 710 may be set to a broadcast ID, indicating that the message 700 is a broadcast message for all tuned-in ONUs. The message type ID field 720 is about one octet long. The message type ID field 720 may be set to a value of 0x1B in hexadecimal format to indicate that the message 700 is a Power_Consumption_Inquire PLOAM message. The SeqNo field 730 is about one octet long and indicates a PLOAM message sequence number. When the message 700 is directed to a particular ONU, the SeqNo field 730 is a unicast PLOAM message sequence number. Alternatively, when the message 700 is a broadcast message, the SeqNo field 730 is a broadcast PLOAM message sequence number. The padding field 740 is about 36 octets long. For example, a sender of the message 700 may set the padding field 740 to values of zeros and a receiver of the message 700 may ignore and discard the padding field 740. The MIC field 750 is about 8 octets long and indicates a value computed from the ONU-ID field 710, the message type ID field 720, the SeqNo filed 730, and the padding field 740 by employing a cipher-based message authentication code (CMAC) algorithm with a 128-bit advanced encryption standard (AES-128) encryption algorithm. When the message 700 is a broadcast message, the MIC field 750 is computed by employing a default PLOAM integrity key (PLOAM_IK). When the message 700 is directed to a particular ONU, the MIC field 750 is computed by employing a specific PLOAM_IK derived from ONU-specific information.

Figure 8:
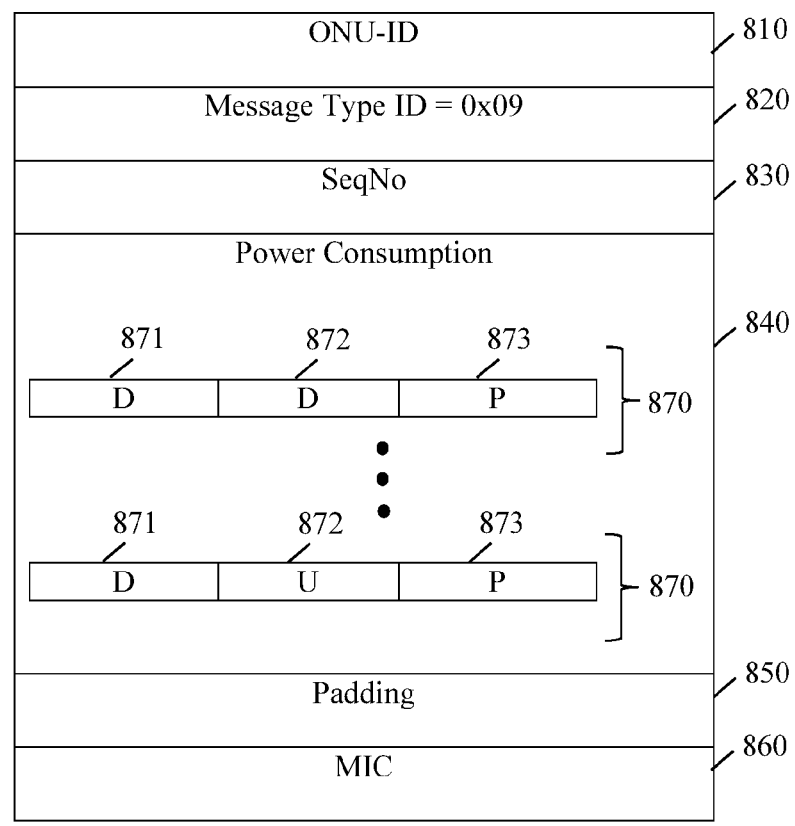
FIG. 8 is a schematic diagram of a power consumption report message according to an embodiment of the disclosure.

FIG. 8 is a schematic diagram of a power consumption report message 800 according to an embodiment of the disclosure. The message 800 is employed by an ONU, such as the ONU 150, to send an ONU power consumption report to an OLT, such as the OLT 105, in response to a power consumption inquiry, such as the message 700, from the OLT as described in the protocol diagram 400 and the method 500. The message 800 is referred to as an upstream Power_Consumption_Report PLOAM message. For example, the ONU may send the message 800 as a standalone message in a PLOAM channel. The message 800 comprises an ONU-ID field 810, a message type ID field 820, a SeqNo field 830, a power consumption field 840, a padding field 850, and an MIC field 860.

The ONU-ID field 810 is about two octets long and identifies a sender of the message 800. The message type ID field 820 is about one octet long. The message type ID field 820 may be set to a value of 0x09 in hexadecimal format to indicate that the message 800 is a Power_Consumption_Report PLOAM message. The SeqNo field 830 is about one octet long and is set to a value equal to a sequence number of a power consumption inquiry message such as the message 700 that triggers the message 800.

The power consumption field 840 is about 24 octets long and indicates ONU power consumption for a plurality of wavelength channels. The power consumption field 840 comprises a plurality of power consumption information sub-fields 870. Each power consumption information sub-field 870 is associated with an upstream wavelength channel or a downstream wavelength channel. Each power consumption information sub-field 870 comprises a D field 871, a U field 872, and a P field 873. The D field 871 is about 4 bits long. The U field 872 is about 4 bits long. When the power consumption information sub-field 870 is associated with a downstream channel, the D field 871 indicates a downstream wavelength channel ID that identifies the downstream wavelength channel and the U field 872 is set to a value of zero. When the power consumption information sub-field 870 is associated with an upstream wavelength channel, the D field 871 is set to a value of zero and the U field 872 indicates an upstream wavelength channel ID that identifies the upstream wavelength channel. The P field 873 is about 2 octets long and indicates an ONU power consumption value of the associated wavelength channel identified by the D field 871 or the U field 872. The power consumption value is in linear units of milliwatt (mW). For example, the power consumption value may represent an absolute power or a relative power. When employing relative power to represent power consumption, all P fields 873 comprise offset power values with respect to a fixed reference power level. When the ONU power consumption for a wavelength channel indicated by the D field 871 or the U field 872 is unknown, the P field 873 is set to values of zeros.

The padding field 850 is about 12 octets long and is similar to the padding field 740. The MIC field 860 is about 8 octets long. The MIC field 860 is computed by employing similar mechanisms as the MIC field 750. However, the MIC field 860 is computed from the ONU-ID field 810, the message type ID field 820, the SeqNo filed 830, the power consumption field 840, and the padding field 850. It should be noted that the power consumption field 840 may carry power consumption information for about eight wavelength channels, for example, about four upstream wavelength channels and about four downstream wavelength channels. An ONU may send multiple messages 800 to report power consumption for more than eight wavelength channels.

As described above, the ONU power consumption may change in different TWDM channels, given ONU's own component characteristics. The OLT may collect ONU power consumption information via PLOAM messages Power_Consumption_Report, and then instruct the ONU to tune to the wavelength channel with lower power consumption.

The following table illustrates a Power_Consumption_Inquire message:

TABLE 1

Power_Consumption_Inquire Message

| Octet | Content | Description |
|---|---|---|
| 1-2 | ONU-ID | Directed message to one ONU or broadcast message to all tuned-in ONUs. |
| 3 | 0x1B | Message type ID "Power_Consumption_Inquire". |
| 4 | SeqNo | Unicast or broadcast PLOAM sequence number, as appropriate. |
| 5-40 | Padding | Set to 0x00 by the transmitter; treated as "don't care" by the receiver. |
| 41-48 | MIC | Message integrity check, computed using the default PLOAM_IK in case of broadcast message, and using the ONU-specific derived shared PLOAM_IK in case of directed message. |

The following table illustrates a Power_Consumption_Report message:

TABLE 2

Power_Consumption_Report Message

| Octet | Content | Description |
|---|---|---|
| 1 | ONU-ID | ONU-ID of the message sender. |
| 3 | 0x09 | Message Type ID: "Power_Consumption_Report Message". |
| 4 | SeqNo | Same as downstream sequence number. |
| 5-28 | Power consumption | Power Consumption comprises a 16-bit indicator for each TWDM channel in the system. Packing and arrangement is: "DDDDUUUU XXXX XXXX XXXX XXXX" repeats 8 times, each one represents one downstream or upstream wavelength channel and its associated power consumption estimation information. DDDDUUUU represents a TWDM downstream or upstream wavelength channel; 0xFF represents a 16-bits reserved field. XXXXXXXX XXXX XXXX represents power consumption of an associated TWDM channel in units of mW (a maximal value of 65.535 Watt); 0x0000 represents unknown power consumption for the associated TWDM channel. ONU may report its power consumption in linear units of mW (absolute power) or that with a same |

TABLE 2-continued

Power_Consumption_Report Message

| Octet | Content | Description |
|---|---|---|
| | | offset (relative power) for different channels to the OLT. It supports the ONU to report power consumption for 8 channels in one message. ONUs may response twice if reporting more than 8 channels power information. |
| 29-40 | Padding | Set to 0x00 by the transmitter; treated as "don't care" by the receiver. |
| 41-48 | MIC | Message integrity check computed using the default PLOAM integrity key. |

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A first apparatus comprising:
   a receiver configured to receive from a second apparatus a power consumption inquire message instructing the first apparatus to provide channel-specific power consumption of the first apparatus;
   a processor coupled to the receiver and configured to generate, in response to the power consumption inquire message, a power consumption report message indicating the channel-specific power consumption; and
   a transmitter coupled to the processor and configured to transmit the power consumption report message to the second apparatus.

2. The first apparatus of claim 1, wherein the first apparatus is an optical network unit (ONU) and the second apparatus is an optical line terminal (OLT).

3. The first apparatus of claim 1, wherein the receiver is further configured to receive, from the second apparatus and in response to the power consumption report message, an instruction to tune to a wavelength channel with a lower power consumption.

4. The first apparatus of claim 1, wherein the power consumption inquire message comprises:
   an optical network unit (ONU) identifier (ID) field indicating a directed message to one ONU or broadcast to all tuned-in ONUs;
   a message type ID field indicating the power consumption inquire message;

a sequence number field indicating a unicast physical layer operations, administration and maintenance (PLOAM) sequence number or a broadcast PLOAM sequence number;
a padding field indicating treatment as "don't care"; and
a message integrity check (MIC) field.

5. The first apparatus of claim 1, wherein the power consumption report message comprises:
an optical network unit (ONU) identifier (ID) field indicating an ONU ID of a message sender;
a message type ID field indicating the power consumption report message;
a sequence number field indicating a save value as a downstream sequence number;
a power consumption field indicating power consumption for each time- and wavelength-division multiplexing (TWDM) channel in a system;
a padding field indicating treatment as "don't care"; and
a message integrity check (MIC) field.

6. The first apparatus of claim 3, wherein the receiver is further configured to receive, from the second apparatus and in response to the power consumption report message, an instruction to tune to a wavelength channel with a lowest power consumption.

7. The first apparatus of claim 4, wherein the one ONU is the first apparatus, the tuned-in ONUs comprise the first apparatus, or the one ONU is the first apparatus and the tuned-in ONUs comprise the first apparatus.

8. The first apparatus of claim 4, wherein the padding field is set to 0x00 and is treated as "don't care" by the first apparatus.

9. The first apparatus of claim 4, wherein the MIC field is computed using a default PLOAM integrity key (IK) in case of a broadcast message and using an ONU-specific derived shared PLOAM IK in case of a directed message.

10. The first apparatus of claim 5, wherein the message sender is the first apparatus.

11. The first apparatus of claim 5, wherein the padding field is set to 0x00 and is treated as "don't care" by the second apparatus.

12. The first apparatus of claim 5, wherein the MIC field is computed using a default physical layer operations, administration and maintenance (PLOAM) integrity key (IK).

13. A method comprising:
receiving a power consumption inquire message instructing provision of channel-specific power consumption;
generating, in response to the power consumption inquire message, a power consumption report message indicating the channel-specific power consumption; and
transmitting the power consumption report message.

14. The method of claim 13, wherein an optical network unit (ONU) implements the method, and wherein the method further comprises:
further receiving the power consumption inquire message from an optical line terminal (OLT); and
further transmitting the power consumption report message to the OLT.

15. The method of claim 13, wherein the power consumption inquire message comprises:
an optical network unit (ONU) identifier (ID) field indicating a directed message to one ONU or broadcast to all tuned-in ONUs;
a message type ID field indicating the power consumption inquire message;
a sequence number field indicating a unicast physical layer operations, administration and maintenance (PLOAM) sequence number or a broadcast PLOAM sequence number;
a padding field indicating treatment as "don't care"; and
a message integrity check (MIC) field.

16. The method of claim 13, wherein the power consumption report message comprises:
an optical network unit (ONU) identifier (ID) field indicating an ONU ID of a message sender;
a message type ID field indicating the power consumption report message;
a sequence number field indicating a save value as a downstream sequence number;
a power consumption field indicating power consumption for each time- and wavelength-division multiplexing (TWDM) channel in a system;
a padding field indicating treatment as "don't care"; and
a message integrity check (MIC) field.

17. A first apparatus comprising:
a processor configured to generate a power consumption inquire message instructing a second apparatus to provide channel-specific power consumption of the second apparatus;
a transmitter coupled to the processor and configured to transmit the power consumption inquire message to the second apparatus; and
a receiver coupled to the processor and configured to receive, from the second apparatus and in response to the power consumption inquire message, a power consumption report message indicating the channel-specific power consumption.

18. The first apparatus of claim 17, wherein the first apparatus is an optical line terminal (OLT), wherein the second apparatus is an optical network unit (ONU), wherein the power consumption inquire message comprises a first ONU identifier (ID) field, a first message type ID field, a first sequence number field, a first padding field, and a first message integrity check (MIC) field, and wherein the power consumption report message comprises a second ONU ID field, a second message type ID field, a second sequence number field, a power consumption field, a second padding field, and a second MIC field.

19. A method comprising:
generating a power consumption inquire message instructing provision of channel-specific power consumption;
transmitting the power consumption inquire message; and
receiving, in response to the power consumption inquire message, a power consumption report message indicating the channel-specific power consumption.

20. The method of claim 19, wherein an optical line terminal (OLT) implements the method, wherein the power consumption inquire message comprises a first optical network unit (ONU) identifier (ID) field, a first message type ID field, a first sequence number field, a first padding field, and a first message integrity check (MIC) field, and wherein the power consumption report message comprises a second ONU ID field, a second message type ID field, a second sequence number field, a power consumption field, a second padding field, and a second MIC field.

* * * * *

UNITED STATES PATENT AND TRADEMARK OFFICE
CERTIFICATE OF CORRECTION

PATENT NO. : 9,973,296 B2
APPLICATION NO. : 15/720719
DATED : May 15, 2018
INVENTOR(S) : Jianhe Gao et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

This patent is subject to a terminal disclaimer.

Signed and Sealed this
Twenty-sixth Day of June, 2018

Andrei Iancu
*Director of the United States Patent and Trademark Office*